US009824203B2

(12) United States Patent
Narasimha et al.

(10) Patent No.: US 9,824,203 B2
(45) Date of Patent: Nov. 21, 2017

(54) UTILIZING A RADIO FREQUENCY IDENTIFICATION TAG TO ASSESS THE BATTERY LEVEL OF A PERIPHERAL DEVICE

(71) Applicant: Motorola Mobility LLC, Chicago, IL (US)

(72) Inventors: Murali Narasimha, Vernon Hills, IL (US); Roger W Ady, Chicago, IL (US); Robert T Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 140 days.

(21) Appl. No.: 14/687,480

(22) Filed: Apr. 15, 2015

(65) Prior Publication Data
US 2016/0307007 A1 Oct. 20, 2016

(51) Int. Cl.
*G06F 21/35* (2013.01)
*G06K 7/00* (2006.01)
*H04W 12/06* (2009.01)
*H04W 4/00* (2009.01)
*G07C 9/00* (2006.01)

(52) U.S. Cl.
CPC .......... *G06F 21/35* (2013.01); *G06K 7/0008* (2013.01); *H04W 4/008* (2013.01); *H04W 12/06* (2013.01); *G07C 9/00* (2013.01); *H04L 2463/082* (2013.01)

(58) Field of Classification Search
None
See application file for complete search history.

(56) References Cited

U.S. PATENT DOCUMENTS

| 7,236,742 | B2 | 6/2007 | Hall et al. |
| 7,589,616 | B2 | 9/2009 | Klatsmanyi |
| 7,826,865 | B2 | 11/2010 | Rofougaran |
| 7,835,730 | B2 | 11/2010 | Boss |
| 8,010,153 | B2 | 8/2011 | Rofougaran |
| 8,320,955 | B2 | 11/2012 | Rofougaran |
| 8,400,297 | B2 * | 3/2013 | Tuttle .................. G06K 7/0008 340/10.33 |

(Continued)

FOREIGN PATENT DOCUMENTS

| JP | 2012018552 A | 1/2012 |
| JP | 2014093685 A | 5/2014 |

(Continued)

OTHER PUBLICATIONS

Murali Narasimha, et al., "Utilizing a Radio Frequency Identification Tag to Control One or More Operational of a Peripheral Device", U.S. Appl. No. 14/687,366, filed Apr. 15, 2015.

(Continued)

*Primary Examiner* — Daniell L Negron
(74) *Attorney, Agent, or Firm* — Watson Intellectual Property Group

(57) ABSTRACT

Pursuant to at least some embodiments, the present disclosure relates to a method that includes configuring an RFID tag to store information related to a battery charge level of a battery of a peripheral device, reading the RFID tag, and disabling a subsequent reading of the RFID tag in response to determining that the RFID tag includes stored information indicative of the battery charge level being low or depleted.

20 Claims, 12 Drawing Sheets

(56) References Cited

U.S. PATENT DOCUMENTS

| | | |
|---|---|---|
| 8,754,748 B2 | 6/2014 | Orlassino |
| 8,862,052 B2 | 10/2014 | Corda |
| 2007/0141997 A1 | 6/2007 | Wulff |
| 2007/0182566 A1 | 8/2007 | Kim |
| 2008/0160984 A1 | 7/2008 | Benes |
| 2008/0162968 A1* | 7/2008 | Breen .................. G06F 1/3203 713/323 |
| 2008/0237355 A1 | 10/2008 | Ahn et al. |
| 2009/0221232 A1 | 9/2009 | Estevez |
| 2009/0224892 A1 | 9/2009 | Nicholls |
| 2009/0239593 A1 | 9/2009 | Jayasinghe |
| 2010/0048255 A1* | 2/2010 | Jojivet ................. G06K 7/0008 455/573 |
| 2011/0127843 A1 | 6/2011 | Karaoguz et al. |
| 2013/0088335 A1 | 4/2013 | Babu |
| 2014/0191041 A1 | 7/2014 | Zhao |
| 2014/0191846 A1 | 7/2014 | Zhao |

FOREIGN PATENT DOCUMENTS

| | | |
|---|---|---|
| WO | 2006065839 A1 | 12/2006 |
| WO | 2008089854 A1 | 7/2013 |
| WO | 2013187790 A1 | 12/2013 |

OTHER PUBLICATIONS

Murali Narasimha, et al., "Utilizing Radio Frequency Identification Tags to Display Messages and Notifications on Peripheral Devices", U.S. Appl. No. 14/687,471, filed Apr. 15, 2015.
UK Combined Search and Examination Report for Application No. GB1605269.8, dated Sep. 30, 2016, 8 pages.

* cited by examiner

UTILIZING A RADIO FREQUENCY IDENTIFICATION TAG TO ASSESS THE BATTERY LEVEL OF A PERIPHERAL DEVICE

FIELD OF THE DISCLOSURE

The present disclosure relates to communications between or among electronic devices and, more particularly, to methods, apparatuses, and systems for utilizing a radio frequency identification (RFID) tag to assess the battery level of a peripheral device.

BACKGROUND OF THE DISCLOSURE

Peripheral devices for use with electronic equipment are typically equipped with small batteries in order to provide a device package that is compact in size and light in weight. By way of illustration and not limitation, examples of peripheral devices may include Bluetooth headsets, smart watches, keypads, computer mice, pointers, and other types of devices. These peripheral devices are sometimes referred to as accessory devices, and the two terms are used interchangeably herein. The power consumption of peripheral devices may be significant relative to the battery capacity. There is a need for techniques to drive down power consumption on such devices without compromising user experience.

Security and control of access to smartphones and other electronic devices is very important, but access control is currently an area of poor user experience. For example, password-based authentication schemes have been used in smartphones for a long time. However, passwords are unwieldy for smartphones and result in a suboptimal user experience. Over the past few years, smartphones have included several alternative types of user authentication such as facial recognition and fingerprint recognition. Such biometric authentication systems often have a high likelihood of failure. For example, facial recognition systems are very sensitive to lighting conditions, whereas fingerprint sensors are quite sensitive to the cleanliness of the fingertip and the sensor. Other access control mechanisms include keeping the smartphone unlocked when attached to a Bluetooth peer or a specific Wi-Fi access point; however, such mechanisms have inherent security loopholes.

Passwords and security codes used to authenticate users are prone to security problems, particularly when such passwords are simple. Users prefer to set up simple passwords or personal identification numbers (PINs) to make them easier to remember, and to make it faster to unlock the smartphone. At the same time, simple passwords may be easier for onlookers to watch and read.

Electronic access control mechanisms are not limited to the smartphone environment. Of perhaps even greater significance are electronic mechanisms for controlling access to physical locations such as buildings, homes, or cars. Conventionally, electronic badges are used to allow access to offices. Badges generally are equipped with a radio frequency identification (RFID) tag, which is scanned by an RFID reader at a point of entry or access point to allow access to the holder of the badge. If the badge is lost, there is a significant security problem—a person who finds the badge may be able to access the office. It is easy to see that a similar problem exists with conventional car keys, home keys, and office keys.

RFID technology uses electromagnetic fields to transfer data. RFID tags are attached to objects and are "read" by RFID readers. These RFID tags may be powered solely by RF power received from the RFID reader, or by magnetic induction, or the RFID tags may be equipped with a battery. In addition to access control, another exemplary use of RFID technology is to track objects and manage inventory. RFID is preferable over barcodes for many applications since the tag does not need to be in a line of sight of the reader.

An operation of reading an RFID tag can be used as a trigger to perform some other action or actions. One such illustrative system is described in U.S. Pat. No. 8,862,052, entitled "NFC mobile communication device and NFC reader." Likewise, a method of using RFID to initiate a connection between a handheld device and a base unit is described in U.S. Pat. No. 7,236,742, entitled "System and method for wireless data transfer for a mobile unit", Univ. Brigham Young.

BRIEF SUMMARY OF THE INVENTION

In at least some embodiments, the present invention relates to a method that includes configuring an RFID tag to store information related to a battery charge level of a battery of a peripheral device, reading the RFID tag, and disabling a subsequent reading of the RFID tag in response to determining that the RFID tag includes stored information indicative of the battery charge level being low or depleted.

Additionally, in at least some embodiments, the present invention relates to a method that includes storing information in an RFID tag related to a battery charge level of a peripheral device; reading the RFID tag to retrieve the stored battery charge level; and determining whether or not to communicate with the peripheral device in response to the retrieved stored battery charge level.

Further, in at least some embodiments, the present invention relates to an apparatus that includes an RFID tag configured to store information related to a battery charge level of a battery of a peripheral device; an RFID reader configured for reading the RFID tag; and a mobile device, operatively coupled to the RFID reader, and configured for disabling a subsequent reading of the RFID tag in response to determining that the RFID tag includes stored information indicative of the battery charge level being low or depleted.

Additionally, in at least some embodiments, the present invention relates to an apparatus that includes an RFID tag configured for storing information related to a battery charge level of a peripheral device; an RFID reader configured for reading the RFID tag to retrieve the stored battery charge level; and a mobile device, operatively coupled to the RFID reader, and configured for determining whether or not to communicate with the peripheral device in response to the retrieved stored battery charge level.

Further, in at least some embodiments, the present invention relates to an apparatus that includes an RFID tag configured for storing information related to a battery charge level of a peripheral device; an RFID reader configured for reading the RFID tag to retrieve the stored battery charge level; and a battery charger, operatively coupled to the RFID reader, and configured to initiate a charging of a battery of the peripheral device in response to the retrieved stored battery charge level indicating a battery charge level below an optimum threshold.

DETAILED DESCRIPTION

Figure 1:
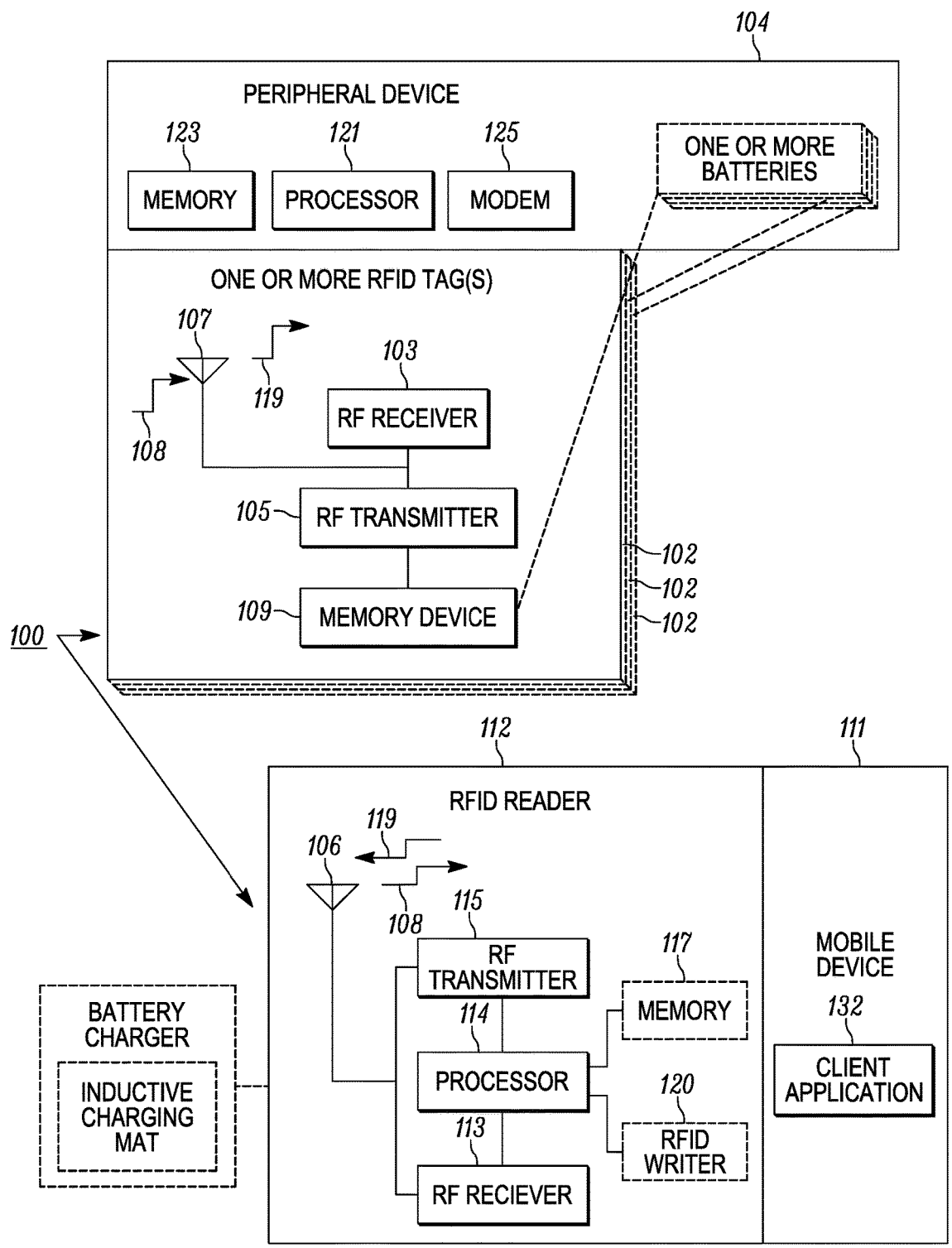
FIG. 1 is a hardware block diagram showing an illustrative system for utilizing a radio frequency identification (RFID) tag to enhance a user experience with a peripheral device in accordance with a set of exemplary embodiments.

Use of RFID technology in the context of smartphones and wireless devices is advantageous. By equipping a smartphone with an RFID reader, it is possible to interact with RFID tags to enhance the user experience in many significant ways. If a peripheral device is equipped with an RFID tag, the RFID reader on the smartphone may read the RFID tag and trigger other actions on the peripheral device. For example, a peripheral device may be placed in a power saving mode and be activated only in response to the smartphone triggering the RFID reader to read the RFID tag. This functionality enables significant battery life improvement in the peripheral device.

The following problems should be considered in order to make the interaction between the smartphone and the peripheral device effective and useful. First, if it is desired to display a message to a user who is in possession of a wearable peripheral device, then a smartphone may be used to establish a robust two-way communication channel between itself and the peripheral device (e.g., using Bluetooth or WiFi). RFID does not constitute such a two-way communication channel.

Second, even if the peripheral device is located in close proximity to the smartphone, the peripheral device may not be able to establish a connection to the smartphone. This situation may arise if the battery on the peripheral device is low or depleted. As a result, the smartphone will repeatedly read the RFID tag in an attempt to trigger the peripheral device to an "on" state.

Third, for peripheral devices that are expected to establish wireless connections, scanning the wireless medium can drain the battery power of the peripheral device significantly. For instance, if the peripheral device is expected to scan for WiFi access points in the same way that smartphones do, the battery life of the peripheral device would suffer significantly. Techniques to minimize power consumption prior to establishing wireless connections are beneficial.

In at least some sets of embodiments, RFID readers and tags are used to achieve reduced power consumption. In other sets of embodiments, RFID technology is used to solve practical problems that may arise when controlling access to electronic devices or physical areas, such as eliminating or reducing the risk of illegal access due to lost RFID badges and RFID key fobs. Yet another set of embodiments provides a user authentication scheme for a smartphone that reduces a reliance on passwords and biometric authentication, while maintaining at least a desired level of security that has heretofore been provided by passwords and biometric authentication. Still another object of the present invention is to provide a smartphone user authentication scheme that provides a password or personal identification number (PIN) mechanism that is robust against spying and interception.

Pursuant to at least some embodiments, the present disclosure relates to a peripheral device that is equipped with an RFID tag. The RFID tag includes a memory device configured for electronically storing information, an RF receiver configured for receiving an interrogation signal, and an RF transmitter operatively coupled to the RF receiver and the memory device. The RF transmitter is configured for: (a) modulating an RF carrier with the electronically stored information from the memory device, and (b) transmitting the modulated RF carrier, in response to the RF receiver receiving the interrogation signal. The received interrogation signal is used to control one or more operational parameters or operational states of the peripheral device. Illustratively, operational states include an "on" state of the device and the interrogation signal is used to power the peripheral device to an "on" state.

According to another set of embodiments, the received interrogation signal is used to provide a message or a notification from a mobile device to the peripheral device.

According to another set of embodiments, the received interrogation signal is used to initiate and complete a communications link between a mobile device and the peripheral device. The mobile device is equipped with an RFID reader. The RFID reader includes an RF transmitter for generating the interrogation signal, and an RF receiver for receiving and demodulating the modulated RF carrier transmitted by the RFID tag. In response to the mobile device issuing a command to the RFID reader, the RFID reader transmits the interrogation signal. In response to the RFID tag receiving the interrogation signal, the peripheral device detects an energizing of the RFID tag. The energizing of the RFID tag provides an indication to the peripheral device that a bi-directional communication link should be established between the mobile device and the peripheral device.

FIG. 1 is a hardware block diagram showing an illustrative system 100 for utilizing a radio frequency identification (RFID) tag 102 to enhance a user experience with a peripheral device 104 in accordance with a set of exemplary embodiments. The peripheral device 104 is equipped with the RFID tag 102. By way of illustration and not limitation, peripheral device 104 may, but need not, represent a Bluetooth headset, a smart watch, a keypad, a computer mouse, a pointer, or another type of peripheral device. It may be noted that these peripheral devices are sometimes referred to as accessory devices, and the two terms are used interchangeably herein. Moreover, in some embodiments, the peripheral device 104 may, but need not, represent a laptop computer, a personal computer, a tablet device, or any other type of computer. In other embodiments, the peripheral device may, but need not, represent a second mobile device. For example, assuming that the peripheral device 104 is a computer, then if the computer is equipped or associated with the RFID tag 102, the mobile device 111 can use the RFID reader 112 to write one or more WiFi connection parameters to the RFID tag 102 as described previously to enable the computer to connect to a Wi-Fi network.

The RFID tag 102 includes a memory device 109 configured for electronically storing information, an RF receiver 103 configured for receiving an interrogation signal 108 via an antenna 107, and an RF transmitter 105 operatively coupled to the RF receiver 103 and the memory device 109, and configured for modulating an RF carrier with the electronically stored information to provide a modulated RF carrier 119, and transmitting the modulated RF carrier 119 in response to the RF receiver 103 receiving the interrogation signal 108. The RF receiver 103 and the RF transmitter 105 are operatively coupled to the antenna 107. The received interrogation signal 108 may be used to control one or more operational parameters of the peripheral device 104. Illustratively, the one or more operational parameters include powering the peripheral device 104 to an "on" state. Optionally, the RFID tag 102 may include a processor, whereupon the RFID tag 102 may be referred to as an active RFID tag. If the RFID tag 102 does not include a processor, then the RFID tag 102 may be referred to as a passive RFID tag.

A mobile device 111 is equipped with an RFID reader 112. The RFID reader 112 includes an RF transmitter 115 for generating the interrogation signal 108, an RF receiver 113 for receiving and demodulating the modulated RF carrier 119 transmitted by the RFID tag 102, a processor 114 operatively coupled to the RF receiver 113 and the RF transmitter 115 for controlling the RF receiver 113 and the RF transmitter 115, and an optional memory 117 operatively coupled to the processor 114. An antenna 106 is operatively coupled to the RF transmitter 115 and to the RF receiver 113. The RFID reader 112 may, but need not, also include an RFID writer 120 that is configured to write information to the RFID tag 102. In response to the mobile device 111 issuing a command to the RFID reader 112, the RFID reader 112 transmits the interrogation signal 108. In response to the RFID tag 102 receiving the interrogation signal 108, the peripheral device 104 detects an energizing of the RFID tag 102. The energizing of the RFID tag 102 provides an indication to the peripheral device 104 that a communication link should be established between the mobile device 111 and the peripheral device 104.

The mobile device 111 is representative of any communication device that is operated by persons (or users) or possibly by other entities (e.g., other computers) desiring or requiring communication capabilities. In some embodiments, for example, the mobile device 111 may be any of a smartphone, a cellular telephone, a personal digital assistants (PDA), another type of handheld or portable electronic device, a headset, an MP3 player, a battery-powered device, a wearable device, a wristwatch, a radio, a navigation device, a laptop or notebook computer, a netbook, a pager, a PMP (personal media player), a DVR (digital video recorder), a gaming device, a game interface, a camera, an e-reader, an e-book, a tablet device, a navigation device with a video-capable screen, a multimedia docking stations, or another type of electronic mobile device.

Figure 2:
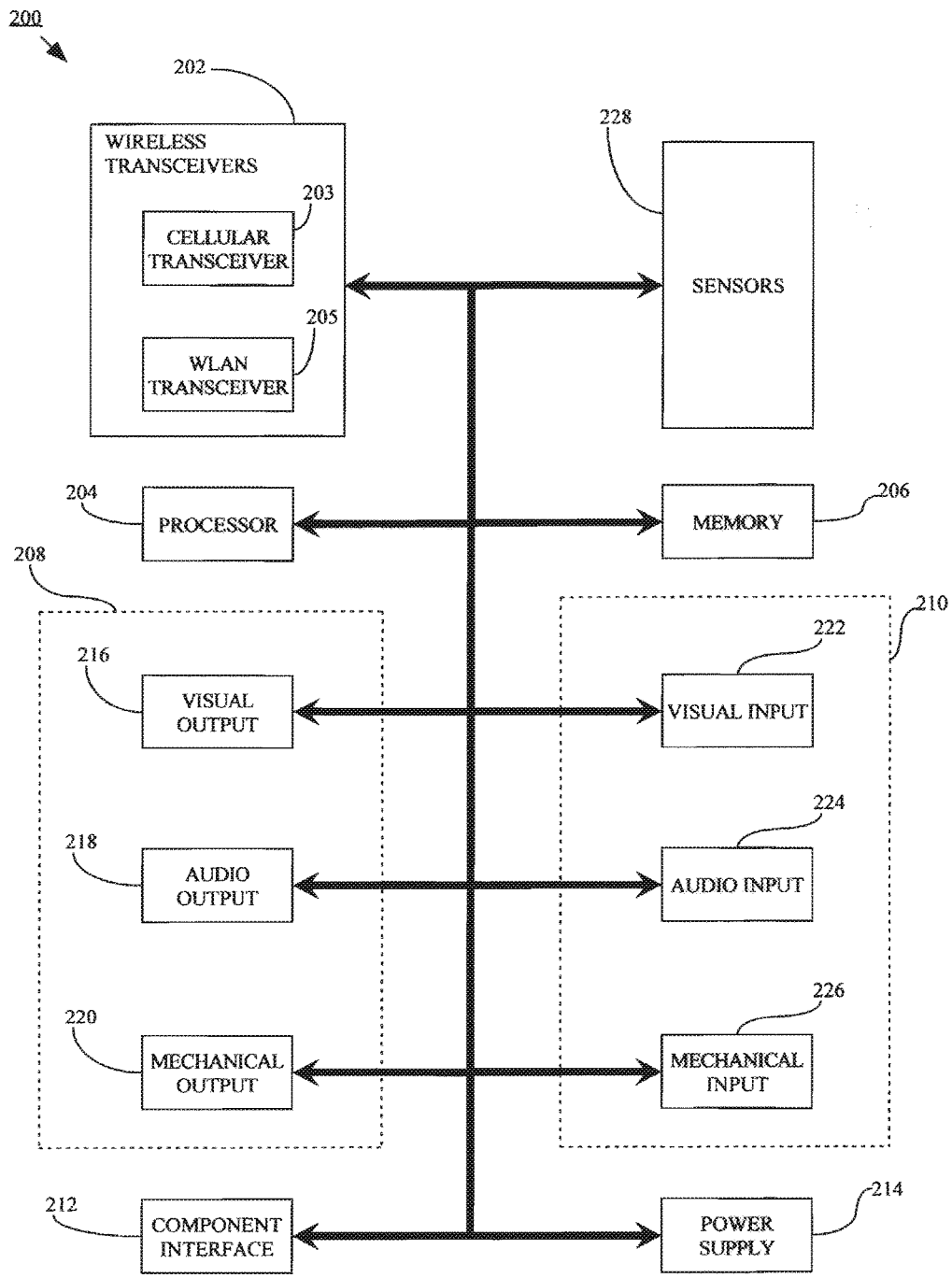
FIG. 2 is a hardware block diagram illustrating exemplary internal components for the mobile device of FIG. 1.

FIG. 2 is a block diagram illustrating exemplary internal components 200 of the mobile device 111 of FIG. 1. As shown in FIG. 2, the components 200 include one or more wireless transceivers 202, a processor portion 204 (e.g., a microprocessor, microcomputer, application-specific integrated circuit, etc.), a memory portion 206, one or more output devices 208, and one or more input devices 210. In at least some embodiments, a user interface is present that comprises one or more output devices 208, such as a display, and one or more input devices 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. All of the internal components 200 can be coupled to one another, and in communication with one another, by way of one or more internal communication links 232 (e.g., an internal bus).

In the present embodiment of FIG. 2, the wireless transceivers 202 particularly include a cellular transceiver 203 and a wireless local area network (WLAN) transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

The WLAN transceiver 205 may, but need not, be configured to conduct Wi-Fi communications in accordance with the IEEE 802.11 (a, b, g, or n) standard with access points. In other embodiments, the WLAN transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the WLAN transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the mobile device 108 has two of the wireless transceivers 203 and 205, the present disclosure is intended to encompass numerous embodiments in which any arbitrary number of (e.g., more than two) wireless transceivers employing any arbitrary number of (e.g., two or more) communication technologies are present.

Exemplary operation of the wireless transceivers 202 in conjunction with others of the internal components 200 of the mobile device 111 (FIG. 1) can take a variety of forms and can include, for example, operation in which, upon reception of wireless signals, the internal components detect communication signals and the transceiver 202 (FIG. 2) demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals by way of wireless and (possibly wired as well) communication links to other devices such as the server 106 and one or more of the content provider websites (as well as possibly to other devices such as a cell tower, access point, or another server or any of a variety of remote devices).

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 can include, among other things, a video screen. Likewise, by example, the input device(s) 210 can include one or more visual input devices 222 such as an optical sensor that may, but need not, be a camera, one or more audio input devices 224 such as a microphone, and one or more mechanical input devices 226 such as a flip sensor, keyboard, keypad, selection button, navigation cluster, touch pad, touchscreen, capacitive sensor, motion sensor, and switch. Actions that can actuate one or more of the input devices 210 can include not only the physical pressing/actuation of buttons or other actuators, but can also include, for example, opening the mobile device (if it can take on open or closed positions), unlocking the device, moving the device to actuate a motion, moving the device to actuate a location positioning system, and operating the device.

As shown in FIG. 2, the internal components 200 may also include one or more of various types of sensors 228. The sensors 228 can include, for example, proximity sensors (a light detecting sensor, an ultrasound transceiver or an infrared transceiver), touch sensors, altitude sensors, a location circuit that can include, for example, a Global Positioning System (GPS) receiver, a triangulation receiver, an accelerometer, a tilt sensor, a gyroscope, or any other information collecting device that can identify a current location or user-device interface (carry mode) of the mobile device 108. Although the sensors 228 are for the purposes of FIG. 2 considered to be distinct from the input devices 210, in other embodiments it is possible that one or more of the input devices can also be considered to constitute one or more of the sensors (and vice-versa). Additionally, even though in the present embodiment the input devices 210 are shown to be distinct from the output devices 208, it should be recognized that in some embodiments one or more devices serve both as input device(s) and output device(s). For example, in embodiments where a touchscreen is employed, the touchscreen can be considered to constitute both a visual output device and a mechanical input device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor portion 204 in a single device (e.g., a processing device including memory or processor-in-memory (PIM)), albeit such a single device will still typically have distinct portions/sections that perform the different processing and memory functions and that can be considered separate devices.

The data that is stored by the memory portion 206 can include, but need not be limited to, operating systems, applications, and informational data, such as a database. Each operating system includes executable code that controls basic functions of the communication device, such as interaction among the various components included among the internal components 200, communication with external devices via the wireless transceivers 202 and/or the component interface 212, and storage and retrieval of applications and data, to and from the memory portion 206. In addition, the mobile device 108 can include one or more applications. Each application can include executable code that utilizes an operating system to provide more specific functionality for the communication devices, such as file system service and the handling of protected and unprotected data stored in the memory portion 206. Informational data is non-executable code or information that can be referenced and/or manipulated by an operating system or application for performing functions of the communication device. One such application is client application 132, as shown in FIG. 1, which is provided for performing the methods described herein.

The client application 132 is intended to be representative of any of a variety of client applications that can perform the same or similar functions on any of various types of mobile devices, such as mobile phones, tablets, laptops, etc. The client application 132 is a software-based application that operates on the processor portion 204 (FIG. 2) and is configured to provide an interface between the mobile device 111 (FIG. 1) and one or more others of the components of the system 100. In addition, the client application 132 governs operation of one or more of the input and output devices 210, 208 (FIG. 2). Further, the client application 132 (FIG. 1) may be configured to work in conjunction with a visual interface, such as a display screen, that allows a user of the mobile device 111 to initiate various actions. The client application 132 can take any of numerous forms and, depending on the embodiment, be configured to operate on, and communicate with, various operating systems and devices. It is to be understood that various processes described herein as performed by the mobile device 111 can be performed in accordance with operation of the client application 132 in particular, and/or other application(s), depending on the embodiment.

Figure 3:
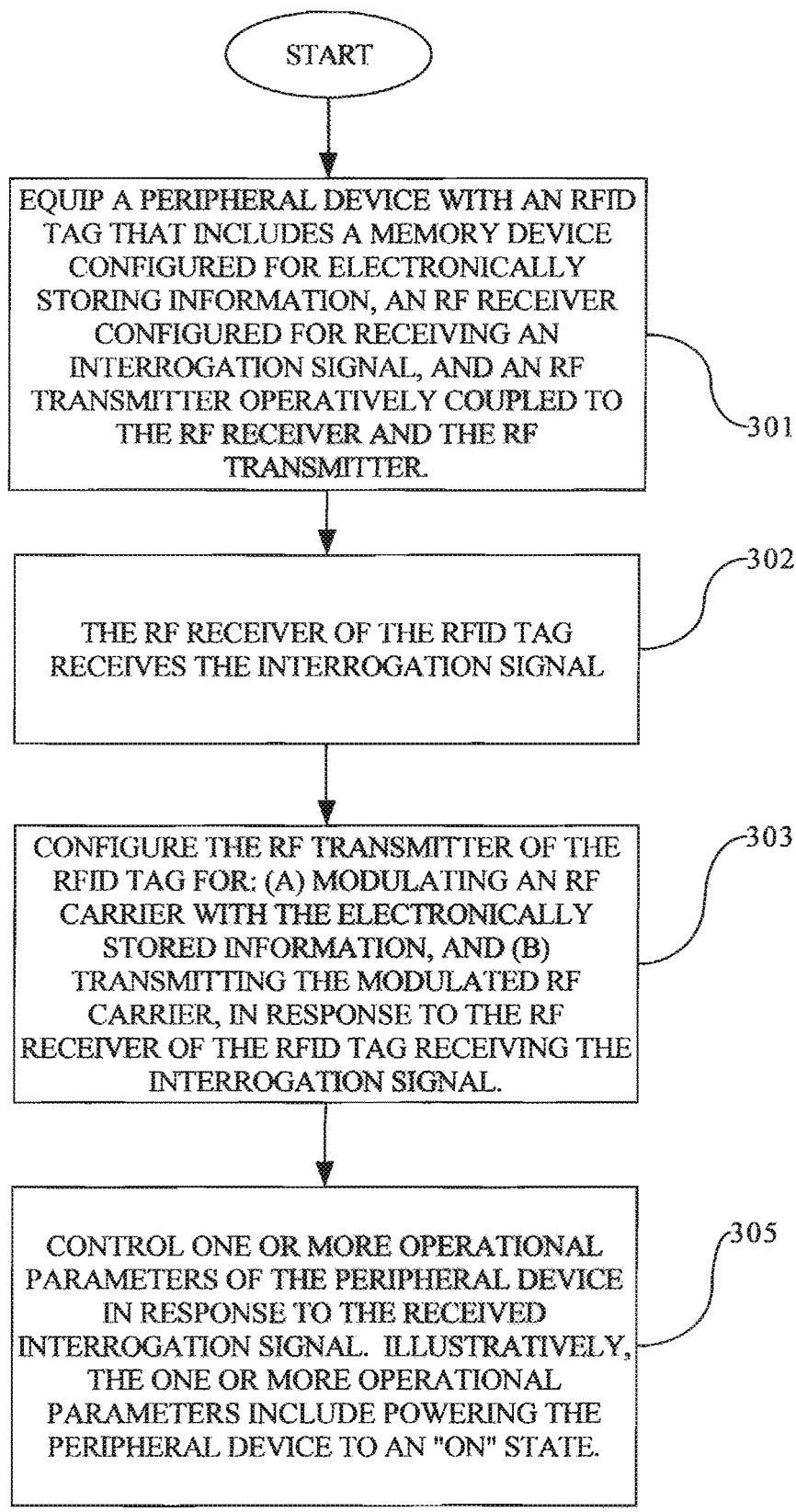
FIG. 3 is a flowchart showing a first illustrative operational sequence that may be performed by the system of FIG. 1.

FIG. 3 is a flowchart showing a first illustrative operational sequence that may be performed by the system of FIG. 1, and particularly by a peripheral device. The operational sequence of FIG. 3 commences at block 301 where a peripheral device, such as the peripheral device 104 (FIG. 1), is equipped with an RFID tag, such as the RFID tag 102. The RFID tag 102 includes a memory device 109 configured for electronically storing information, an RF receiver 103 configured for receiving an interrogation signal 108, and an RF transmitter 105 operatively coupled to the RF receiver 103 and the memory device 109.

At block 302 (FIG. 3), the interrogation signal 108 is received by the RF receiver 103. Next, at block 303 (FIG. 3), the RF transmitter 105 (FIG. 1) is configured for: (a) modulating an RF carrier with the electronically stored information from the memory device 109, and (b) transmitting the modulated RF carrier, in response to the RF receiver 103 receiving the interrogation signal 108 at block 302 (FIG. 3). The operational sequence of FIG. 3 then progresses to block 305 where the received interrogation signal is used to control one or more operational parameters of the peripheral device 104 (FIG. 1). Illustratively, the one or more operational parameters include powering the peripheral device 104 from an "off" state, "sleep" state, or "standby" state to an "on" state. Alternatively or additionally, the one or more operational parameters include powering the peripheral device 104 from an "on" state to an "off" state, "sleep" state, or "standby" state.

Figure 4:
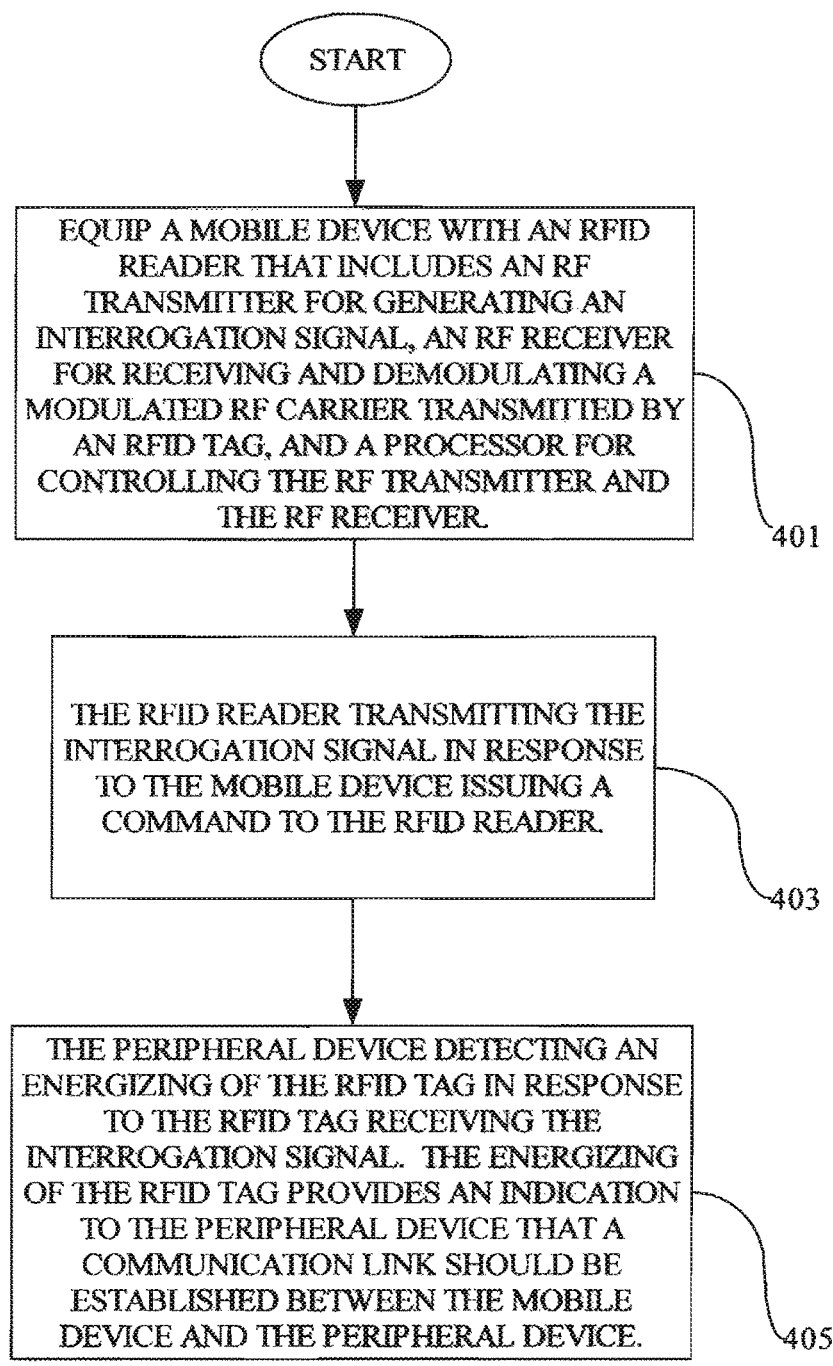
FIG. 4 is a flowchart showing a second illustrative operational sequence that may be performed by the system of FIG. 1.

FIG. 4 is a flowchart showing a second illustrative operational sequence that may be performed by the system of FIG. 1. The operational sequence of FIG. 4 commences at block 401 where a mobile device 111 (FIG. 1) is equipped with an RFID reader 112. The RFID reader 112 includes an RF transmitter 115 for generating the interrogation signal, an RF receiver 113 for receiving and demodulating the modulated RF carrier transmitted by the RFID tag, and a processor 114 for controlling the RF receiver 113 and the RF transmitter 115.

Next, at block 403, in response to the mobile device 111 (FIG. 1) issuing a command to the RFID reader 112, the RFID reader 112 transmits the interrogation signal. The operational sequence of FIG. 4 progresses to block 405 where, in response to the RFID tag 102 (FIG. 1) receiving the interrogation signal, the peripheral device 104 detects an energizing of the RFID tag 102. The energizing of the RFID tag 102 provides an indication to the peripheral device 104 that a communication link should be established between the mobile device 111 and the peripheral device 104.

Figure 5:
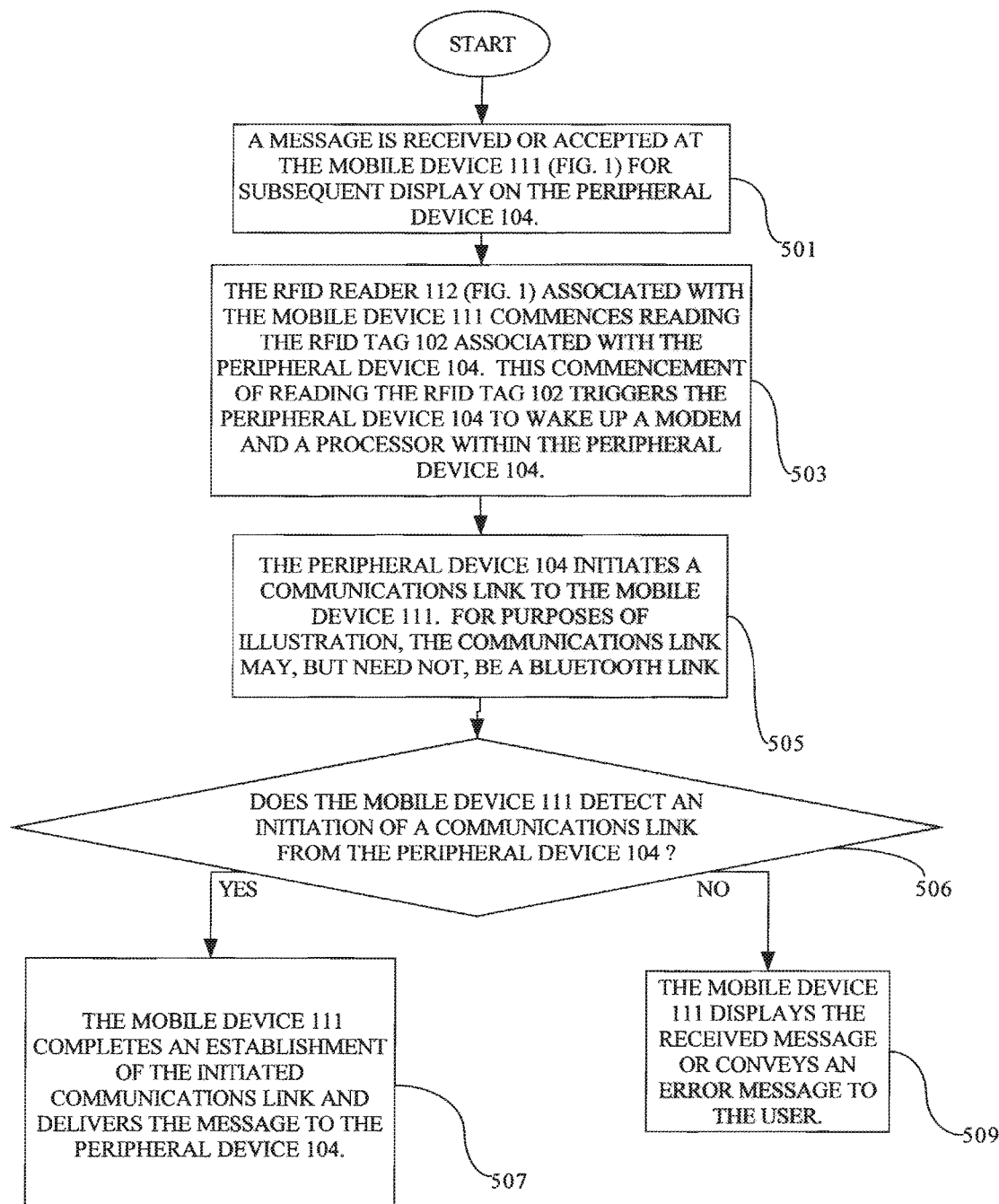
FIG. 5 is a flowchart showing an illustrative operational sequence for performing a presence-based procedure for displaying one or more messages on the peripheral device of FIG. 1.

FIG. 5 is a flowchart showing an illustrative operational sequence for performing a presence-based procedure for displaying one or more messages on the peripheral device 104 (FIG. 1). The operational sequence of FIG. 5 commences at block 501 where a message is received or accepted at the mobile device 111 (FIG. 1) for subsequent display on the peripheral device 104. Next, at block 503 (FIG. 5), the RFID reader 112 (FIG. 1) associated with the mobile device 111 commences reading the RFID tag 102 associated with the peripheral device 104. This commencement of reading the RFID tag 102 triggers the peripheral device 104 to wake up a modem 125 and a processor 121 within the peripheral device 104. The processor 121 may be operatively coupled to a memory 123.

The operational sequence of FIG. 5 progresses to block 505 where the peripheral device 104 (FIG. 1) initiates a communications link to the mobile device 111. For purposes of illustration, the communications link may, but need not, be a Bluetooth link. At block 506, a test is performed to ascertain whether or not the mobile device 111 (FIG. 1) detects an initiation of a communications link from the peripheral device 104. If so, the program advances to block 507 (FIG. 5) where, in response to the mobile device 111 (FIG. 1) detecting an initiation of a communications link from the peripheral device 104, the mobile device 111 completes an establishment of the initiated communications link and delivers the message to the peripheral device 104. The negative branch from block 506 leads to block 509 (FIG. 5) where, in response to the mobile device 111 (FIG. 1) not detecting an initiation of a communications link from the peripheral device 104, the mobile device displays the received message or conveys an error message to the user.

The operational sequence of FIG. 5 ensures that the mobile device 111 (FIG. 1) attempts to display messages on the peripheral device 104 only when the peripheral device 104 is within communication range of the mobile device 111 (for example, when the peripheral device is a watch worn by the user and the mobile device is a smartphone in the user's possession). The trigger of commencing the reading of the RFID tag 102 at block 503 (FIG. 5) can also be used to notify the user of the mobile device 111 (FIG. 1) in any of a number of ways. For example, when the RFID tag 102 on the peripheral device 104 is read, the peripheral device 104 can power an LED on the peripheral device 104 indicating to the user an arrival of the message at either the mobile device 111, or the peripheral device 104, or both. The power supplied to the LED can, but need not, be derived solely from the RFID tag 102 reading activity from the RFID reader 112, without involving an additional power source (such as a battery) or a processor on the peripheral device 104. For example, RF power transmitted from the RFID reader 112 and received by the RFID tag 102 may be used to illuminate the LED.

Figure 6:
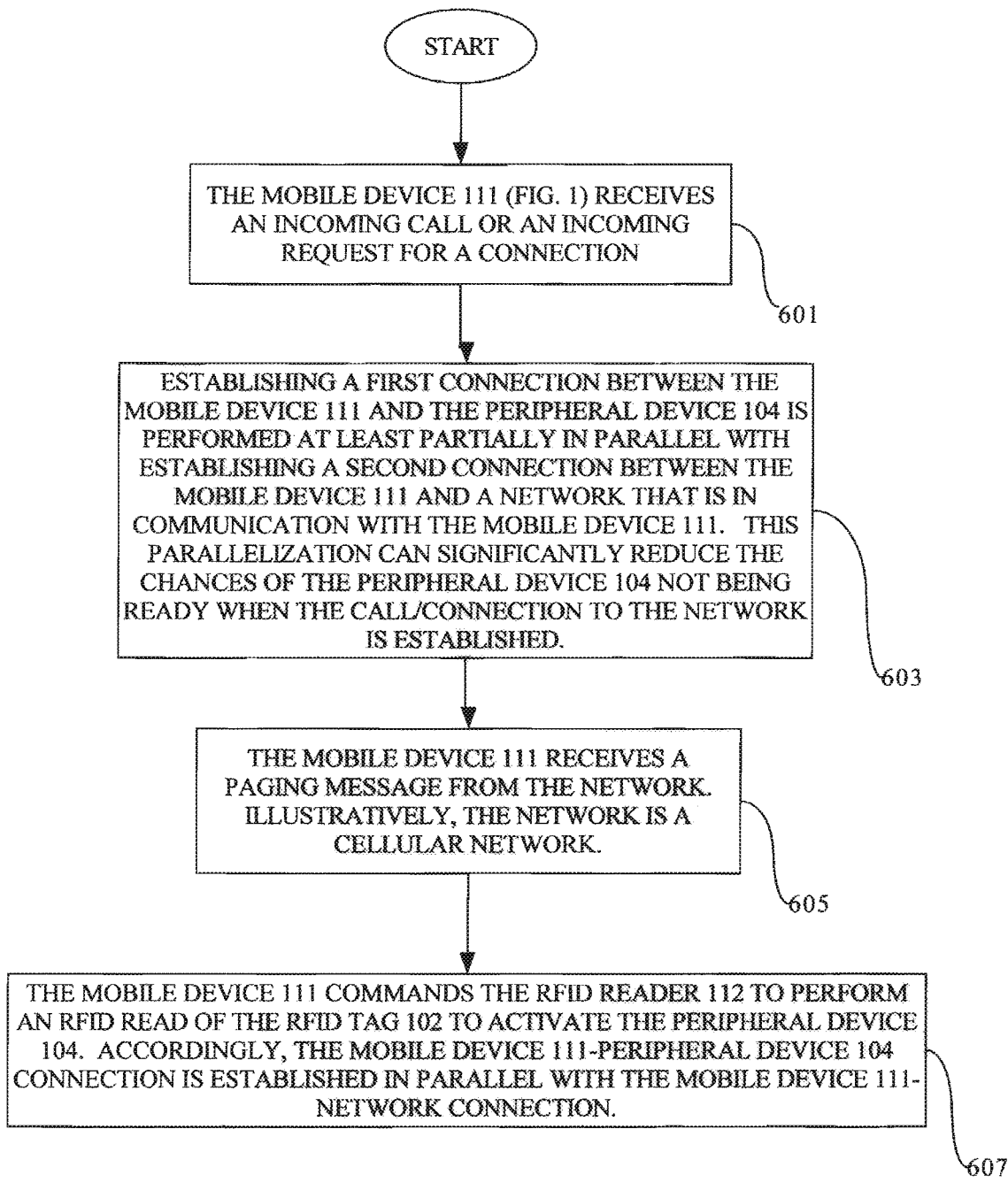
FIG. 6 is a flowchart showing an illustrative operational sequence for performing a fast wakeup of the peripheral device of FIG. 1 so that the peripheral device is prepared for handling an incoming call or connection.

FIG. 6 is a flowchart showing an illustrative operational sequence for performing a fast wakeup of the peripheral device 104 (FIG. 1) so that the peripheral device 104 is prepared for handling an incoming call or connection. The operational sequence of FIG. 6 commences at block 601 where the mobile device 111 (FIG. 1) receives an incoming call or an incoming request for a connection. Next, at block 603, establishing a first connection between the mobile device 111 and the peripheral device 104 is performed at least partially in parallel with establishing a second connection between the mobile device 111 and a network that is in communication with the mobile device 111. This parallelization can significantly reduce the chances of the peripheral device 104 not being ready when the call/connection to the network is established. For example, the establishment of the first connection can be initiated when the user takes actions to place a voice call (such as launching a voice calling service or a dial-pad on the phone). In another example, the establishment of the first connection can be initiated when the mobile device receives a page message from the cellular network and prior to transmitting a response to the page message.

The operational sequence of FIG. 6 progresses to block 605 where the mobile device 111 (FIG. 1) receives a paging message from the network. Illustratively, the network is a cellular network. Next, at block 607, the mobile device 111 (FIG. 1) commands the RFID reader 112 to perform an RFID read of the RFID tag 102 to activate the peripheral device 104. Accordingly, the mobile device 111-peripheral device 104 connection is established in parallel with the mobile device 111-network connection.

Figure 7:
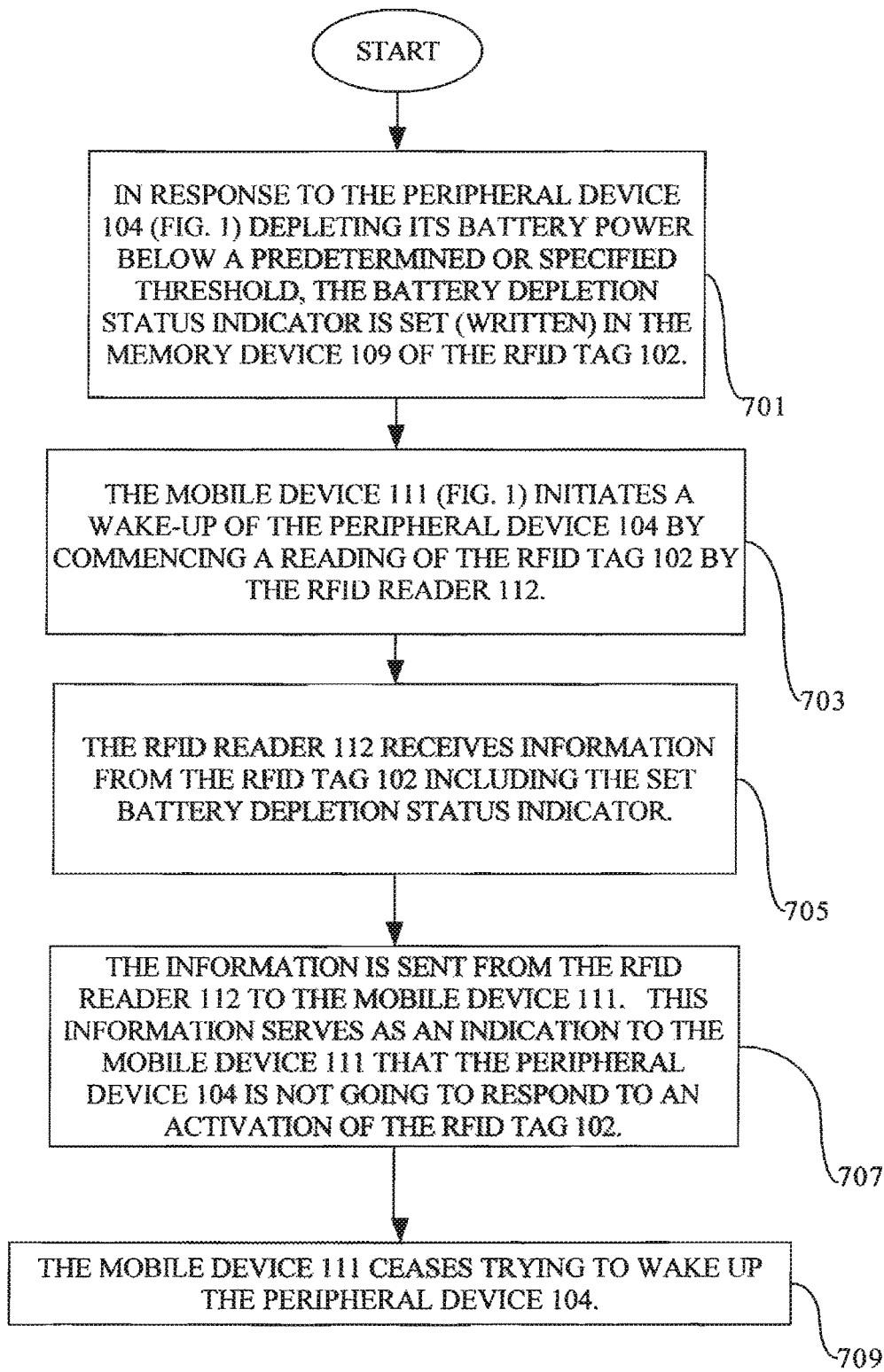
FIG. 7 is a flowchart showing an illustrative operational sequence for using RFID to read, record, or assess a battery status for the peripheral device of FIG. 1.

FIG. 7 is a flowchart showing an illustrative operational sequence for using the RFID tag 102 to read, record, or assess a battery status for the peripheral device 104 (FIG. 1). The peripheral device 104 writes its battery status to the memory device 109 of the RFID tag 102. The battery status may comprise a battery depletion status indicator that is indicative of battery power being depleted below a predetermined or specified threshold. This threshold may be determined with respect to a minimum amount of voltage, a minimum amount of current draw, or a minimum power draw required for proper operation of the peripheral device 104.

The operational sequence of FIG. 7 commences at block 701 where, in response to the peripheral device 104 (FIG. 1) depleting its battery power below a predetermined or specified threshold, the battery depletion status indicator is set (written) in the memory device 109 of the RFID tag 102. Next, at block 703 (FIG. 7), the mobile device 111 (FIG. 1)

initiates a wake-up of the peripheral device 104 by commencing a reading of the RFID tag 102 by the RFID reader 112.

The operational sequence of FIG. 7 continues to block 705 where the RFID reader 112 (FIG. 1) receives information from the RFID tag 102 including the set battery depletion status indicator. The information is sent from the RFID reader 112 to the mobile device 111 at block 707 (FIG. 7). This information serves as an indication to the mobile device 111 (FIG. 1) that the peripheral device 104 is not going to respond to an activation of the RFID tag 102. Accordingly, at block 709, the mobile device 111 (FIG. 1) ceases trying to wake up the peripheral device 104.

Alternatively or additionally, block 701 of FIG. 7 may include writing the battery depletion status indicator to the RFID tag 102 (FIG. 1) so as to enable a proactive charging of the peripheral device 104 using a charging apparatus such as an inductive charging mat. Such a charging apparatus may be configured to charge one or more batteries of other devices such as the mobile device 111 or the peripheral device 104, and may be further configured to read the RFID tag 102 to determine the battery status of the peripheral device 104 in order to determine if the charging apparatus should charge that peripheral device 104. For example, battery charging may be initiated in response to the retrieved stored battery charge level indicating a battery charge level below an optimum threshold. 'An extension of this idea would be to have separate RFID tags on each of a plurality of batteries. Use of separate RFID tags enables monitoring of a set of removable batteries.

Figure 8:
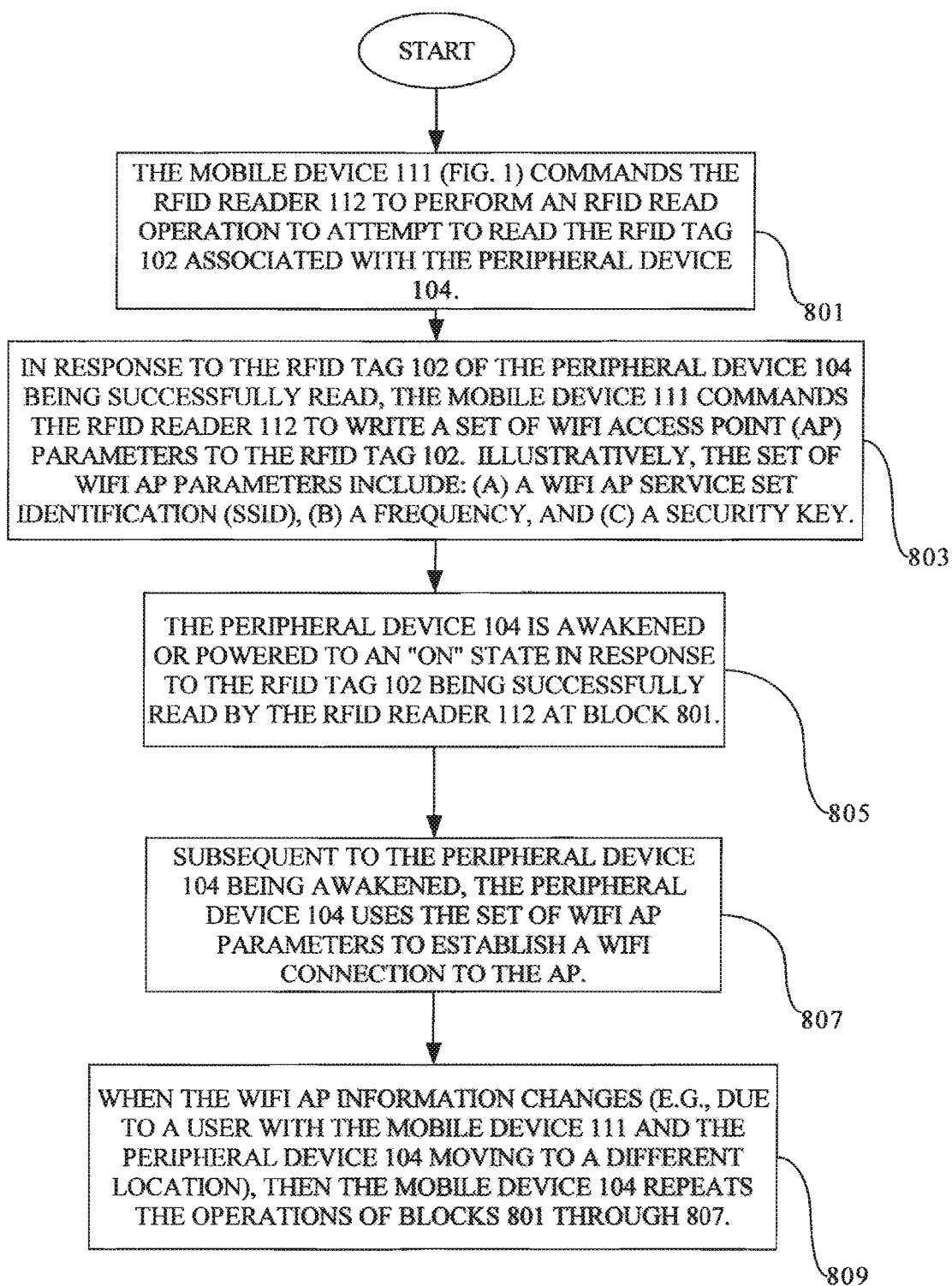
FIG. 8 is a flowchart showing an illustrative operational sequence for using the RFID tag of FIG. 1 to optimize wireless scanning and connection establishment.

FIG. 8 is a flowchart showing an illustrative operational sequence for using the RFID tag 102 of FIG. 1 to optimize wireless scanning and connection establishment. The RFID reader 112 may, but need not, be configured for writing to the RFID tag 102. If so configured, then data that is written to the RFID tag 102 by the RFID reader 112 is then accessible to the peripheral device 104 when access to the data is needed. The flowchart of FIG. 8 illustrates how the RFID tag 102 (FIG. 1) can be used to minimize a scanning operation for initiating and setting up WiFi access at a WiFi-enabled peripheral device such as the peripheral device 104, assuming that a user has access to the mobile device 111 and the RFID reader 112 associated therewith.

The operational sequence of FIG. 8 commences at block 801 where the mobile device 111 (FIG. 1) commands the RFID reader 112 to perform an RFID read operation to attempt to read the RFID tag 102 associated with the peripheral device 104. At block 803 (FIG. 8), in response to the RFID tag 102 of the peripheral device 104 being successfully read, the mobile device 111 commands the RFID reader 112 to write a set of WiFi access point (AP) parameters to the RFID tag 102. Illustratively, the set of WiFi AP parameters include: (a) a WiFi AP service set identification (SSID), (b) a frequency, and (c) a security key.

The operational sequence of FIG. 8 progresses to block 805 where the peripheral device 104 (FIG. 1) is awakened or powered to an "on" state in response to the RFID tag 102 being successfully read by the RFID reader 112 at block 801 (FIG. 8). Next, at block 807, subsequent to the peripheral device 104 (FIG. 1) being awakened, the peripheral device 104 uses the set of WiFi AP parameters to establish a WiFi connection to the AP. At block 809 (FIG. 8), when the WiFi AP information changes (e.g., due to a user with the mobile device 111 (FIG. 1) and the peripheral device 104 moving to a different location), then the mobile device 104 repeats the operations of blocks 801 through 807 (FIG. 8).

Techniques similar to those described with reference to blocks 801-809 may be employed to facilitate or speed up a Bluetooth connection to the peripheral device 104 (FIG. 1). For example, instead of or in addition to the RFID reader 112 writing the set of WiFi AP parameters to the RFID tag 102 at block 803 (FIG. 8), the RFID reader 112 (FIG. 1) writes a Bluetooth security code to the RFID tag 102.

The peripheral device 104 may, but need not, have the capability to communicate with one or more cellular networks. For situations in which the peripheral device 104 is capable of communicating with a cellular network, the RFID tag 102 can be used to speed up a procedure for locating an appropriate cell of the cellular network for establishing a communications link to the cellular network. For example, the mobile device 111 may learn relevant network parameters of the cellular network and then command the RFID reader 112 to write such parameters to the RFID tag 102. These network parameters are then used by the peripheral device 104 when a communications link is to be established between the peripheral device 104 and the cellular network. Examples of such network parameters may include a public land mobile network identifier (PLMN ID), a carrier frequency, and a paging cycle.

Illustratively, the RFID tag 102 may be used to enable a subscriber identity module (SIM) or universal subscriber identity module (USIM) emulation between the mobile device 111 and the peripheral device 104. Parameters needed to enable the peripheral device 104 to use the SIM/USIM credentials of the mobile device 111 are written to a secure memory location of the RFID tag 102, such as the memory device 109. These parameters may then be accessed by the peripheral device 104 which uses the parameters to establish a communications link with the cellular network.

In any of the foregoing examples, the peripheral device 104 may, but need not, represent a laptop computer, a personal computer, a tablet device, or any other type of computer. For example, if a computer is equipped or associated with the RFID tag 102, the mobile device 111 can use the RFID reader 112 to write one or more WiFi connection parameters to the RFID tag 102 as described previously to enable the computer to connect to a Wi-Fi network.

According to a further set of embodiments disclosed herein, a maximum communication range between the RFID reader 112 and the RFID tag 102 may be employed in conjunction with the procedure of FIG. 8 to advantageously filter a plurality of available Bluetooth connections, or to advantageously filter a plurality of available WiFi access points, or both. For example, a plurality of available Bluetooth connections may be filtered to identify a subset of one or more Bluetooth connections from the plurality of available Bluetooth connections. The subset may correspond to devices that are in relatively close proximity to the mobile device 111 relative to at least one other available Bluetooth connection from the plurality of available Bluetooth connections. Likewise, a plurality of available WiFi access points may be filtered to identify a subset of one or more WiFi access points from the plurality of available WiFi access points. The subset may correspond to WiFi access points that are in relatively close proximity to the mobile device 111 relative to at least one other available WiFi access point from the plurality of available WiFi access points.

The use of a maximum communication range between the RFID tag 102 and the RFID reader 112 may be useful in a crowded environment such as an office or public location. In these types of environments, when the mobile device 111 is attempting to establish a connection with the peripheral device 104, it is highly likely that many peer peripheral devices will be discovered for a potential connection, and the peripheral device 104 that is of interest may not even be in a communication range that enables RF communication between the RFID tag 102 and the RFID reader 112. For example, there may be many peer peripheral devices offering a WiFi Peer-to-peer connectivity service or Bluetooth service. When there are a large number of such devices, isolating the device of interest may consume additional battery power and processing capability. Thus, as described previously, the RFID tag 102 and the RFID reader 112 may be used to quickly optimize the search for appropriate WiFi access points or Bluetooth connections or both. For example, the mobile device 111 can first command the RFID reader 112 to attempt an RFID read operation of the RFID tag 102 to determine if the peripheral device 104 of interest is in close proximity. If the RFID reader 112 is able to read the RFID tag 102 of the peripheral device 104 (indicating that the peripheral device 104 is in close proximity), then the mobile device 111 can attempt to establish a peer-to-peer connection via WiFi or Bluetooth. The RFID read operation of the RFID tag 102 can also provide connectivity parameters (such as identifiers) to help make the peer-to-peer connection establishment quicker.

Figure 9:
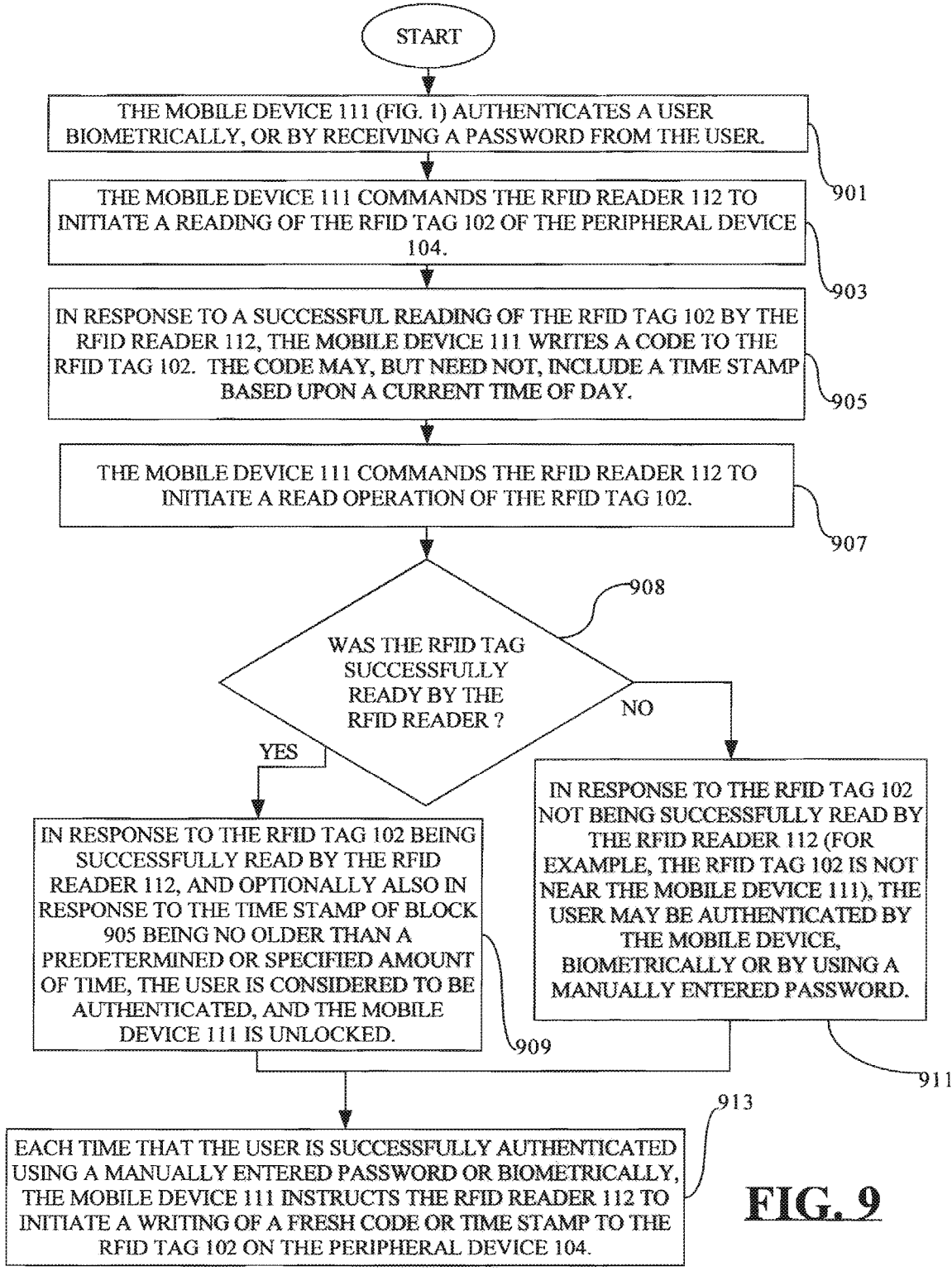
FIG. 9 is a flowchart showing an illustrative operational sequence for using the RFID tag of FIG. 1 to improve an authentication procedure for accessing the mobile device.

FIG. 9 is a flowchart showing an illustrative operational sequence for using the RFID tag 102 of FIG. 1 to improve an authentication procedure for accessing the mobile device 111. The flowchart of FIG. 9 illustrates an improved authentication procedure that reduces or eliminates the need for a user to frequently re-enter his or her password. Illustratively, the mobile device 111 may, but need not, be a smartphone or tablet device. In the context of FIG. 9, it is assumed that the user's mobile device 111 is equipped with an RFID reader 112. The RFID reader 112 is used with a physically separate RFID tag 102. The RFID tag 102 may be in a key fob or a badge, or the RFID tag 102 may be part of the peripheral device 104. The peripheral device may, but need not, be a smart-watch or any other wearable device.

The operational sequence of FIG. 9 commences at block 901 where the mobile device 111 (FIG. 1) authenticates a user biometrically, or by receiving a password from the user. Next, at block 903 (FIG. 9), the mobile device 111 (FIG. 1) commands the RFID reader 112 to initiate a reading of the RFID tag 102 (FIG. 1) of the peripheral device 104. In response to a successful reading of the RFID tag 102 by the RFID reader 112, the mobile device 111 writes a code to the RFID tag 102 at block 905 (FIG. 9). The code may, but need not, include a time stamp based upon a current time of day.

At block 907, the mobile device 111 (FIG. 1) commands the RFID reader 112 to initiate a read operation of the RFID tag 102. Next, at block 909 (FIG. 9), a test is performed to ascertain whether or not the RFID tag 102 (FIG. 1) was successfully read by the RFID reader 112. If so, the program progresses to block 909 where, in response to the RFID tag 102 being successfully read by the RFID reader 112, and optionally also in response to the time stamp of block 905 (FIG. 9) being no older than a predetermined or specified amount of time, the user is considered to be authenticated, and the mobile device 111 (FIG. 1) is unlocked. As an example, block 907 can be performed in response to the user trying to interact with the phone (for example, via the display).

The negative branch from block 908 (FIG. 9) leads to block 911 where, in response to the RFID tag 102 (FIG. 1) not being successfully read by the RFID reader 112 (for example, the RFID tag 102 is not near the mobile device 111), the user may be authenticated, by the mobile device, biometrically or using a manually entered password. From block 909 or block 911, the operational sequence of FIG. 9 then progresses to block 913 where, each time that the user is successfully authenticated using a manually entered password or biometrically, the mobile device 111 (FIG. 1) instructs the RFID reader 112 to initiate a writing of a fresh code or time stamp to the RFID tag 102 on the peripheral device 104.

Optionally, in response to the fresh code or time stamp being written at block 913 (FIG. 9), and for purposes of illustration, while the user is in possession of the peripheral device 104 (FIG. 1), the mobile device 111 may be programmed such that a predetermined or specified amount of time must elapse until the user would once again need to reenter a password or perform biometric authentication. For example, the freshness of the code or time stamp on the RFID tag 102 associated with the peripheral device 104 guarantees the authenticity of the user. The user's need to reenter the password on the mobile device could be limited to situations when (a) the code or time stamp stored in the memory device 109 of the RFID tag 102 is outdated, or (b) the RFID tag 102 is not near the mobile device.

Figure 10:
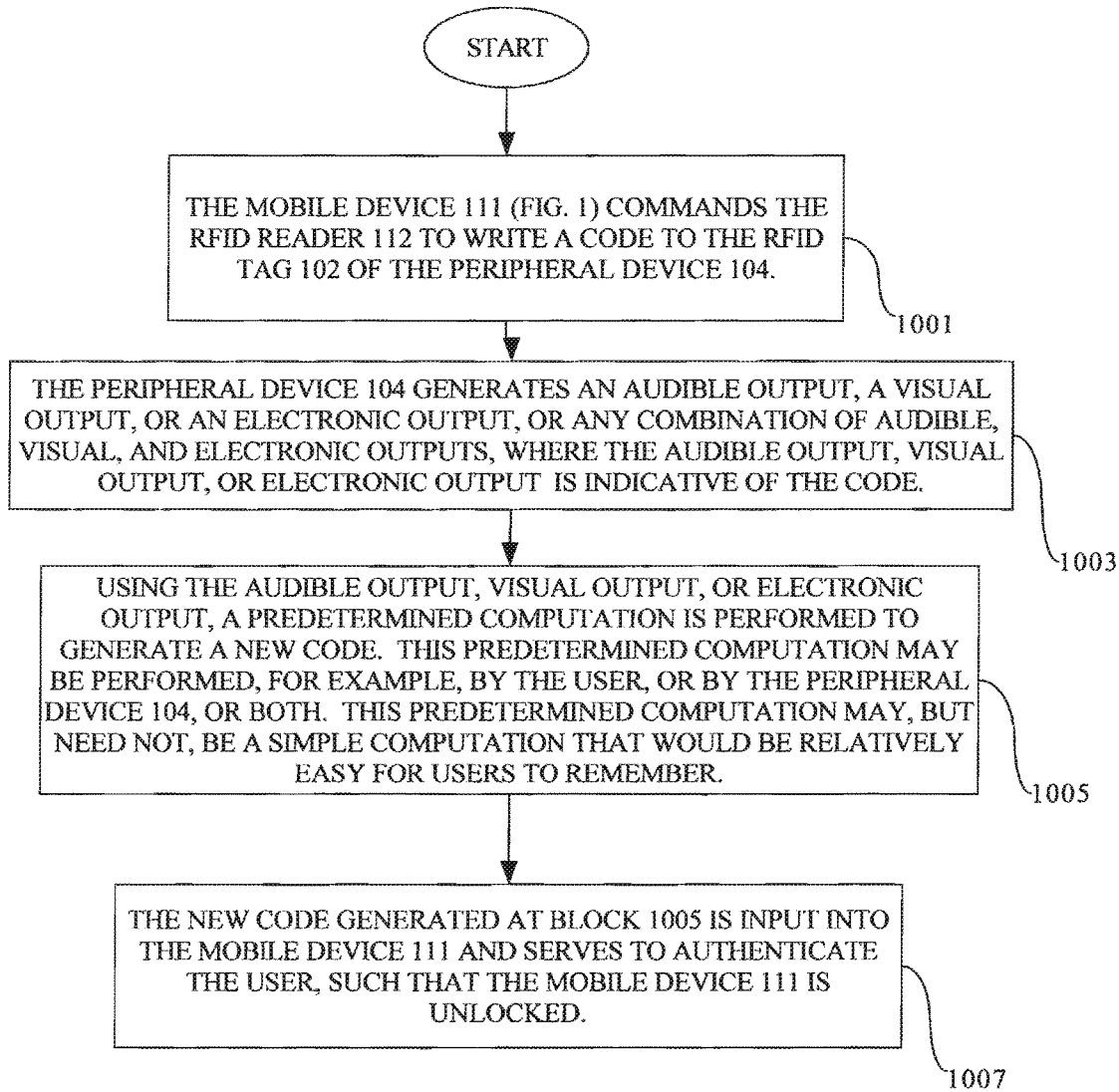
FIG. 10 is a flowchart showing an illustrative operational sequence for using the RFID tag of FIG. 1 to provide a robust user authentication procedure for accessing the mobile device.

FIG. 10 is a flowchart showing an illustrative operational sequence for using the RFID tag 102 of FIG. 1 to provide a robust user authentication procedure for accessing the mobile device 111. More specifically, the procedure of FIG. 10 describes a more robust alternative to the conventional password/security personal identification number (PIN) that is entered to authenticate the user. It is assumed that the user (a) has a mobile device 111 (FIG. 1) equipped with an RFID reader 112, and (b) a peripheral device 104 that is physically separate from the mobile device 111 and that is equipped with the RFID tag 102.

The operational sequence of FIG. 10 commences at block 1001 where the mobile device 111 (FIG. 1) commands the RFID reader 112 to write a code to the RFID tag 102 of the peripheral device 104. Next, at block 1003 (FIG. 10), the peripheral device 104 (FIG. 1) generates an audible output, a visual output, an electronic output, or any combination of audible, visual, and electronic outputs, where the audible, visual, or electronic output is indicative of the code. Using the audible, visual, or electronic output of the peripheral device 104, a predetermined computation is performed at block 1005 (FIG. 10) to generate a new code. This predetermined computation may be performed, for example, by the user, or by the peripheral device 104 (FIG. 1), or by both the user and the peripheral device 104. This predetermined computation may, but need not, be a simple computation that would be relatively easy for users to remember. One illustrative example of the predetermined computation of block 1005 (FIG. 10) could be a reversal of the digits/characters of the code, or a pre-defined reordering of the digits/characters of the code. Then, at block 1007 (FIG. 10), the new code generated at block 1005 is input into the mobile device 111 (FIG. 1) and serves to authenticate the user, such that the mobile device 111 is unlocked.

The procedure of FIG. 10 provides a relatively secure RFID-based method for controlling access to the mobile device 111 (FIG. 1) relative to using conventional passwords due to the following considerations. First, use of the peripheral device 104 as a part of the authentication process makes it difficult or impossible to unlock and access the mobile device 111 without having access to the peripheral device 104. Second, the code that is used changes each time, making it useless for someone to spy the code being entered, or to intercept the code sent to the peripheral device 104. Third, the user computation of block 1005 (FIG. 10) eliminates the risk of illegal unlocking and access if both the mobile device 111 (FIG. 1) and the peripheral device 104 are stolen.

Figure 11:
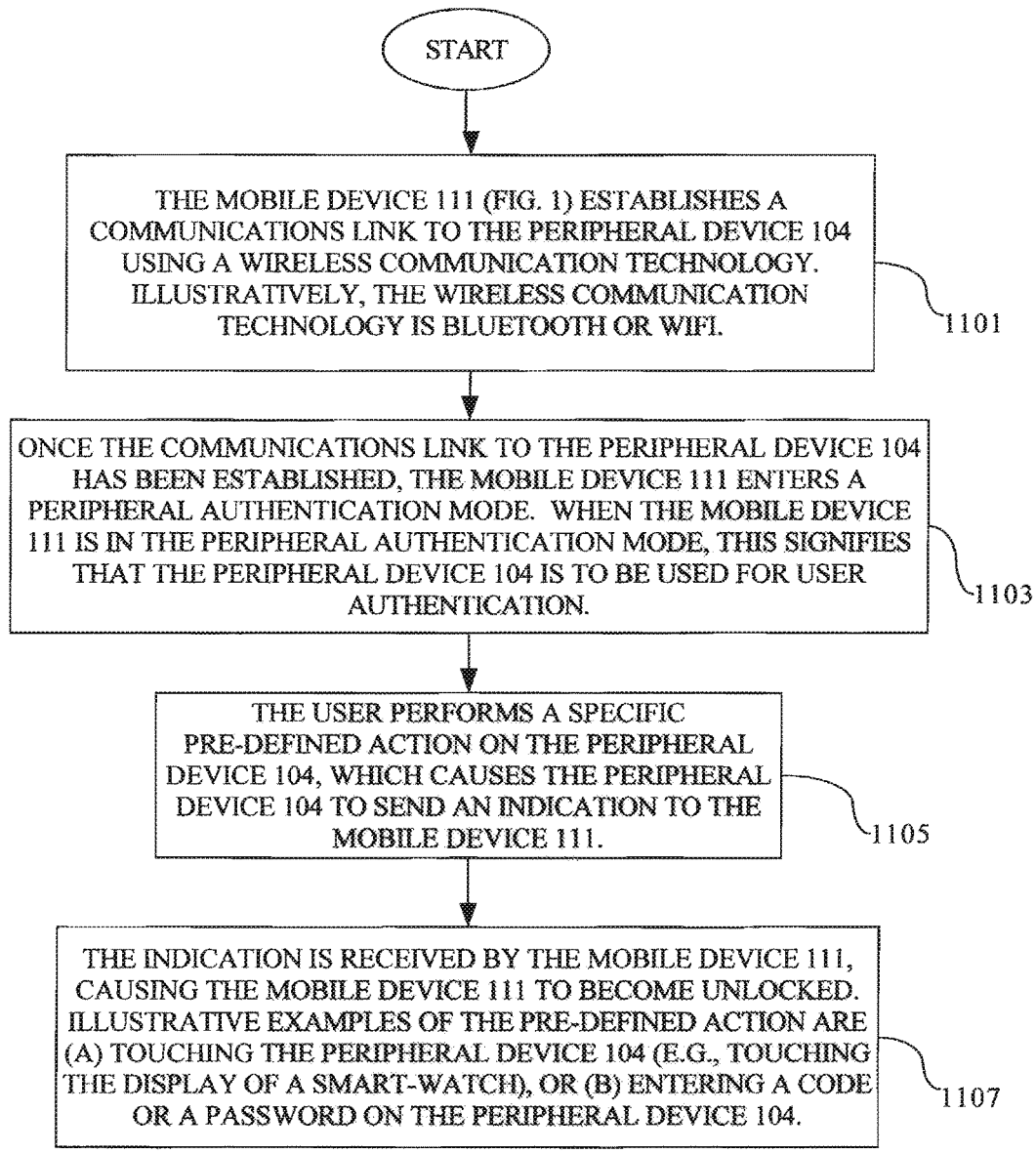
FIG. 11 is a flowchart showing an illustrative operational sequence for providing a robust user authentication procedure for accessing the mobile device of FIG. 1 without using RFID technology.

FIG. 11 is a flowchart showing an illustrative operational sequence for providing a robust user authentication procedure for unlocking and accessing the mobile device 111 (FIG. 1) without using RFID technology. It is assumed that the user is in possession of the peripheral device 104 (which may, but need not, be a smart watch) in addition to the mobile device 111. The operational sequence of FIG. 11 commences at block 1101 where the mobile device 111 (FIG. 1) establishes a communications link to the peripheral device 104 using a wireless communication technology. Illustratively, the wireless communication technology is Bluetooth or WiFi. At block 1103 (FIG. 11), once the communications link to the peripheral device 104 is established, the mobile device 111 (FIG. 1) enters a peripheral authentication mode. When the mobile device 111 is in the peripheral authentication mode, this signifies that the peripheral device 104 is to be used for user authentication.

The operational sequence of FIG. 11 progresses to block 1105 where the user performs a specific pre-defined action on the peripheral device 104 (FIG. 1), which causes the peripheral device 104 to send an indication to the mobile device 111. At block 1107 (FIG. 11), the indication is received by the mobile device 111 (FIG. 1), causing the mobile device 111 to become unlocked. Illustrative examples of the pre-defined action are (a) touching the peripheral device 104 (e.g., touching the display of a smartwatch), (b) entering a code or a password on the peripheral device 104, or (c) a user defined touch gesture.

The mobile device 111 may be programmed such that, when in peripheral authentication mode, the user cannot unlock the mobile device 111 directly via the user interface of the mobile device 111. When the wireless communications link between the mobile device 111 and the peripheral device 104 is broken, the mobile device 111 reverts to conventional user authentication via the user interface of the mobile device 111.

Figure 12:
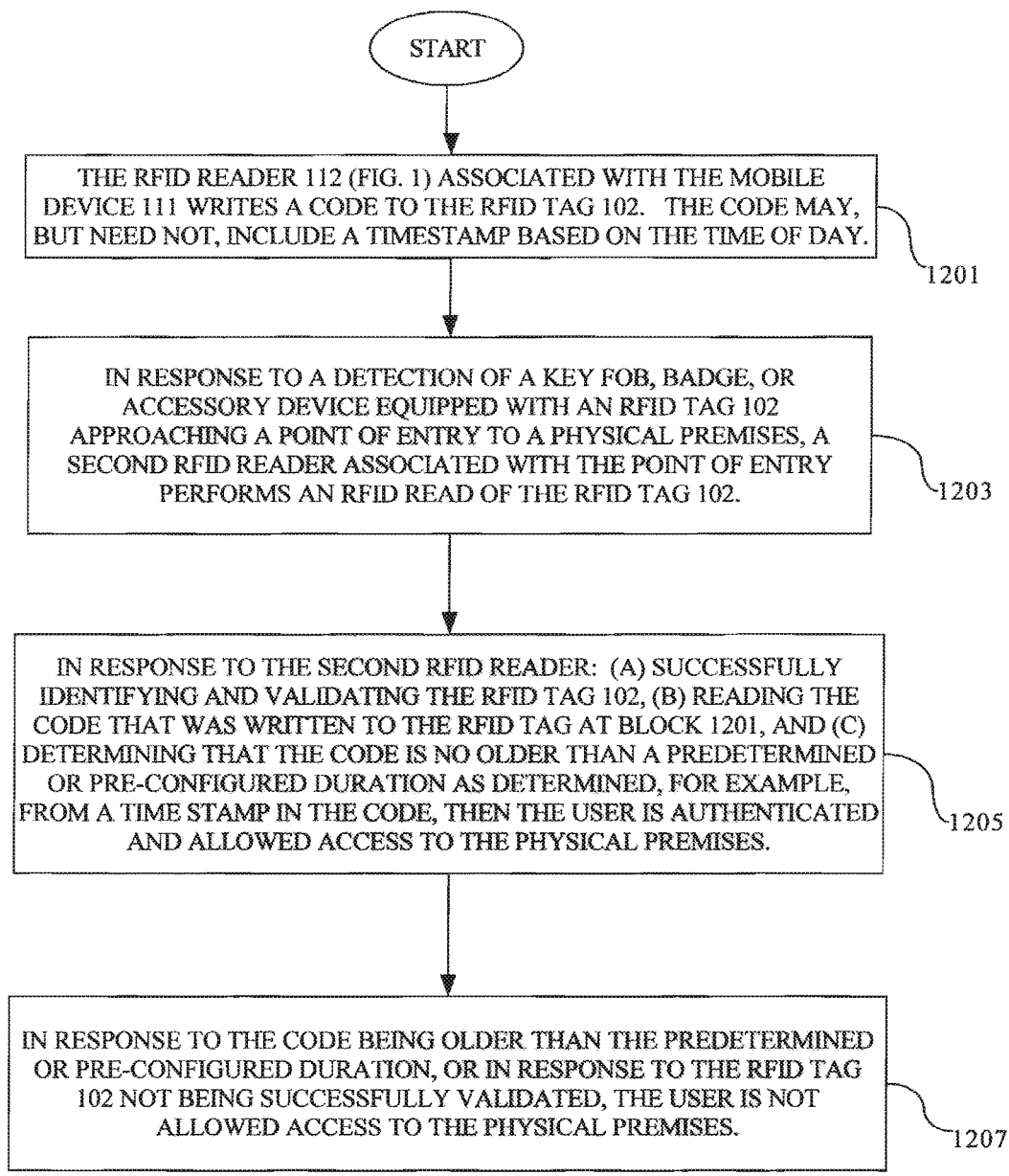
FIG. 12 is a flowchart showing an illustrative operational sequence for providing a two-factor authentication procedure for granting access to physical premises according to a set of illustrative embodiments.

FIG. 12 is a flowchart showing an illustrative operational sequence for providing a two-factor authentication procedure for granting access to a physical premises according to a set of illustrative embodiments. The operational sequence of FIG. 12 may be utilized to eliminate or reduce the problem of unintended or unauthorized access when a key fob, badge, or access card containing an RFID tag 102 (FIG. 1) is lost or stolen. It is assumed herein that a user whose key fob, badge, or access card has been lost or stolen (a) has a mobile device 111 equipped with an RFID reader 112, and (b) a physically separate RFID tag 102. The RFID tag 102 may be in the key fob or badge, or the RFID tag 102 may be part of an accessory device such as a smart-watch.

In the set of embodiments described with reference to FIG. 12, it is assumed that the RFID reader 112 (FIG. 1) also includes an RFID writer configured to write information to the RFID tag 102. The operational sequence of FIG. 12 commences at block 1201 where the RFID reader 112 (FIG. 1) associated with the mobile device 111 writes a code to the RFID tag 102. The code may, but need not, include a timestamp based on the time of day. Next, at block 1203 (FIG. 12), in response to a detection of a key fob, badge, or accessory device equipped with an RFID tag 102 approaching a point of entry to a physical premises (which is indicative of the user who possesses the RFID tag approaching the physical premises), a second RFID reader associated with the point of entry performs an RFID read of the RFID tag 102.

The operational sequence of FIG. 12 progresses to block 1205 where, in response to the second RFID reader: (a) successfully identifying and validating the RFID tag 102, (b) reading the code that was written to the RFID tag at block 1201, and (c) determining that the code is no older than a predetermined or pre-configured duration as determined, for example, from a time stamp in the code, then the user is authenticated and allowed access to the physical premises. At block 1207 (FIG. 12), in response to the code being older than the predetermined or pre-configured duration, or in response to the RFID tag 102 (FIG. 1) not being successfully validated, the user is not allowed access to the physical premises. If the second RFID reader successfully identifies the RFID tag 102 and the code is older than the pre-configured duration, it is an indication that the RFID tag 102 may not be near the mobile device 111 and hence may be stolen. The foregoing procedure may require that the second RFID reader have knowledge of the time of day.

The operational sequence of FIG. 12 may, but need not, be enhanced or modified as follows. For example, the mobile device 111 (FIG. 1) may not write the code to the RFID tag 102 unless the user has been authenticated biometrically or using a password. This added safeguard is to eliminate the possibility of someone stealing a user's mobile device 111 and programming the RFID tag 102 to gain access to the premises. Pursuant to another exemplary embodiment, the procedure of FIG. 12 may be performed such that the mobile device 111 writes one or more codes to the RFID tag 102 based on information received or stored at the mobile device 111 that identifies or specifies the location of the mobile device. For example, when the location of the mobile device 111 is close to the user's work location, a code is written to the RFID tag 102. The foregoing procedure avoids unnecessary writing of the code to the RFID tag 102 (and the associated power consumption).

According to another exemplary embodiment, the procedure of FIG. 12 may be configured such that a single RFID tag 102 can be used to enable secure access to multiple locations. For example, an identifying RFID tag 102 is placed at each of a plurality of doors or points of entry requiring authentication for access. Each RFID tag 102 may be associated with a specific door or point of entry, or a specific type of door, or a specific type of point of entry. For example, if the RFID tag 102 is placed on a residential premises, the RFID tag is associated with a home door, whereas if the RFID tag 102 is placed on a car door, this indicates that the RFID tag is controlling access to a vehicle. Accordingly, a user wanting to enter a particular location launches an application on the mobile device 111. The mobile device 111 then performs an RFID read of the RFID tag 102. Based on the RFID read, the mobile device 111 determines the type of premises the user is trying to enter. The mobile device 111 then programs the RFID tag 102 (for example, in a key fob in the user's possession) with the code as described previously. The user then scans the RFID tag 102 (key fob) to access the premises.

The aforementioned operational sequences of FIGS. 3-12 are merely examples that are intended to be encompassed by the present disclosure. The present disclosure is intended to encompass numerous other manners of operation in addition to those specifically described previously. Numerous other examples of operation of the system 100 in accordance with the process of FIGS. 3-12, or variations of these processes, can be envisioned and are encompassed herein.

For example, in at least some embodiments, the present disclosure relates to a peripheral device that is equipped with an RFID tag. The RFID tag includes a memory device configured for electronically storing information, an RF receiver configured for receiving an interrogation signal, and an RF transmitter operatively coupled to the RF receiver and the RF transmitter, and configured for modulating an RF carrier with the electronically stored information and transmitting the modulated RF carrier in response to the RF receiver receiving the interrogation signal. The received interrogation signal is used to control one or more operational parameters of the peripheral device. Illustratively, the one or more operational parameters include powering the peripheral device to an "on" state.

According to a set of further embodiments of the present invention, a mobile device is equipped with an RFID reader. The RFID reader includes an RF transmitter for generating the interrogation signal and an RF receiver for receiving and demodulating the modulated RF carrier transmitted by the RFID tag. In response to the mobile device issuing a command to the RFID reader, the RFID reader transmits the interrogation signal. In response to the RFID tag receiving the interrogation signal, the peripheral device detects an energizing of the RFID tag. The energizing of the RFID tag provides an indication to the peripheral device that a communication link should be established between the mobile device and the peripheral device.

It should be appreciated that one or more embodiment encompassed by the present disclosure are advantageous in one or more respects.

Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A method comprising:
   configuring an RFID tag to store information related to a battery charge level of a battery of a peripheral device;
   reading the RFID tag by an RFID reader;
   determining by the RFID reader whether the RFID tag includes stored information indicative of the battery charge level being low or depleted;
   and disabling subsequent reading of the RFID tag by the RFID reader in response to a determination determining that the RFID tag includes stored information indicative of the battery charge level being low or depleted.

2. The method of claim 1 further comprising initiating charging of the battery in response to the determination that the RFID tag includes stored information indicative of the battery charge level being low or depleted.

3. The method of claim 2 further comprising initiating the charging of the battery using an inductive charging mat.

4. The method of claim 3 further comprising configuring the inductive charging mat to include the RFID reader.

5. The method of claim 1 further comprising configuring the peripheral device to include a plurality of respective batteries each equipped with a corresponding RFID tag.

6. A method comprising:
   storing information in an RFID tag related to a battery charge level of a peripheral device;
   reading the RFID tag to retrieve the stored battery charge level;
   comparing the retrieved stored battery charge level to a predetermined threshold indicative of a battery charge level that is low or depleted; and
   determining not to communicate with the peripheral device in response to the retrieved stored battery charge level having a value that is indicative of the battery charge level being low or depleted.

7. The method of claim 6 wherein determining not to communicate with the peripheral device includes not attempting to communicate with the peripheral device in response to the retrieved stored battery charge level being below the predetermined threshold or indicating a zero operational battery charge.

8. The method of claim 6 where determining not to communicate with the peripheral device includes not attempting to awaken the peripheral device for placing the device into an active state for communication in response to the retrieved stored battery level indicating that a battery charge level is below the predetermined threshold, or indicating a zero operational battery charge.

9. The method of claim 6 wherein determining not to communicate with the peripheral device includes initiating a charging of a battery of the peripheral device in response to the retrieved stored battery charge level indicating a battery charge level is below the predetermined threshold, or indicating a zero operational battery charge.

10. An apparatus comprising:
    an RFID tag configured to store information related to a battery charge level of a battery of a peripheral device;
    an RFID reader configured for reading the RFID tag; and
    a mobile device, operatively coupled to the RFID reader, that determines whether the RFID tag includes stored information indicative of the battery charge level being low or depleted, that disables subsequent reading of the RFID tag in response to a determination that the RFID tag includes stored information indicative of the battery charge level being low or depleted.

11. The apparatus of claim 10 wherein a charging of the battery is initiated in response to the determination that the RFID tag includes stored information indicative of the battery charge level being low or depleted.

12. The apparatus of claim 11 further comprising an inductive charging mat configured for initiating the charging of the battery.

13. The apparatus of claim 12 wherein the inductive charging mat is configured to include the RFID reader.

14. The apparatus of claim 10 wherein the peripheral device is configured to include a plurality of respective batteries each equipped with a corresponding RFID tag.

15. An apparatus comprising:
    an RFID tag configured for storing information related to a battery charge level of a peripheral device;
    an RFID reader configured for reading the RFID tag to retrieve the stored battery charge level; and
    a mobile device, operatively coupled to the RFID reader, that compares the retrieved stored battery charge level to a predetermined threshold indicative of a battery charge level that is low or depleted, and that determines not to communicate with the peripheral device in response to the retrieved stored battery charge level having a value that is indicative of the battery charge level being low or depleted.

16. The apparatus of claim 15 wherein the mobile device does not attempt to communicate with the peripheral device in response to the retrieved stored battery charge level being below the predetermined threshold or indicating a zero operational battery charge.

17. The apparatus of claim 15 wherein the mobile device does not attempt to awaken the peripheral device for placing the device into an active state for communication in response to the retrieved stored battery level indicating that a battery charge level is below the predetermined threshold, or indicating a zero operational battery charge.

18. The apparatus of claim 15 further comprising a battery charger that initiates a charging of a battery of the peripheral device in response to the retrieved stored battery level indicating a battery charge level is below the predetermined threshold, or indicating a zero operational battery charge.

19. An apparatus comprising:
  an RFID tag configured for storing information related to a battery charge level of a peripheral device;
  an RFID reader configured for reading the RFID tag to retrieve the stored battery charge level; and
  a battery charger, operatively coupled to the RFID reader, that compares the retrieved stored battery charge level to an optimum threshold and that initiates charging of a battery of the peripheral device in response to the retrieved stored battery charge level indicating the battery charge level is below the optimum threshold.

20. The apparatus of claim 19 wherein the battery charger comprises an inductive charging mat.

* * * * *